United States Patent [19]
Beans

[11] Patent Number: 5,882,049
[45] Date of Patent: Mar. 16, 1999

[54] HIGH PRESSURE QUICK CONNECT WITH REDUCED VOLUMETRIC DISPLACEMENT AND PILOTED SNAP RING

[75] Inventor: Bruce A. Beans, Waterford, Mich.

[73] Assignee: ITT Automotive, Inc., Auburn Hills, Mich.

[21] Appl. No.: 768,507

[22] Filed: Dec. 18, 1996

[51] Int. Cl.[6] .............................................. F16L 37/088
[52] U.S. Cl. .......................... 285/321; 285/93; 285/375
[58] Field of Search .............................. 285/93, 23, 321, 285/305, 921, 375

[56] References Cited

U.S. PATENT DOCUMENTS

| | | | |
|---|---|---|---|
| 2,749,151 | 6/1956 | Lyons | 285/305 X |
| 3,127,199 | 3/1964 | Roe | 285/305 X |
| 3,278,206 | 10/1966 | Woodling | 285/334.5 |
| 3,404,904 | 10/1968 | Roe | 285/305 X |
| 3,534,988 | 10/1970 | Lindsey | 285/305 |
| 3,637,239 | 1/1972 | Daniel | 285/93 |
| 3,786,730 | 1/1974 | Linderholm | 29/512 X |
| 4,401,326 | 8/1983 | Blair | 285/318 |
| 4,423,891 | 1/1984 | Menges | 285/305 |
| 4,471,978 | 9/1984 | Kramer | 285/321 |
| 4,598,937 | 7/1986 | Sugao | 285/334.5 X |
| 4,725,081 | 2/1988 | Bauer | 285/305 |
| 4,872,710 | 10/1989 | Konecny et al. | 285/321 X |
| 4,884,829 | 12/1989 | Funk et al. | 285/24 |
| 4,893,657 | 1/1990 | Usui | 285/333 X |
| 5,178,424 | 1/1993 | Klinger | 285/319 |
| 5,207,462 | 5/1993 | Bartholomew | 285/321 |
| 5,275,443 | 1/1994 | Klinger | 285/82 |
| 5,275,448 | 1/1994 | McNaughton et al. | 285/319 |
| 5,335,411 | 8/1994 | Muller et al. | 29/512 |
| 5,374,089 | 12/1994 | Davie et al. | 285/317 |
| 5,378,025 | 1/1995 | Szabo | 285/39 |
| 5,415,443 | 5/1995 | Hayashi | 29/512 X |
| 5,456,500 | 10/1995 | Klinger et al. | 285/93 |
| 5,662,359 | 9/1997 | Kargula | 285/93 |

FOREIGN PATENT DOCUMENTS

| | | | |
|---|---|---|---|
| 233336 | 5/1964 | Austria | 285/305 |
| 275 815 | 7/1988 | European Pat. Off. . | |
| 2346628 | 10/1977 | France . | |
| 2143714 | 3/1973 | Germany | 285/353 |
| 3416702 | 11/1985 | Germany . | |
| 3537502A1 | 4/1987 | Germany . | |
| 3739626 | 6/1989 | Germany | 285/305 |
| 9305916 | 7/1993 | Germany . | |
| 4427597 | 2/1996 | Germany . | |
| 4427598 | 2/1996 | Germany . | |
| 170337 | 10/1921 | United Kingdom | 29/512 |

*Primary Examiner*—Anthony Knight
*Assistant Examiner*—Greg Binda
*Attorney, Agent, or Firm*—Thomas N. Twomey

[57] ABSTRACT

A quick connect coupling for high pressure fluid includes a male fitting body connected on the end of an elongated tube. The male fitting body has an annular recess for receiving a retainer movable between a compressed position allowing longitudinal insertion of the male fitting body within a corresponding female aperture and a released position for retaining the male fitting body seated within the female aperture. A visual indication is provided to signal if the retainer is fully seated within a corresponding groove of the female aperture. A locking member maintains the retainer in the released position in response to seating the male fitting body within the corresponding female aperture. A biasing member urges the male fitting body in an opposite direction with respect to the longitudinal insertion direction within the corresponding female aperture. A pop top releasibly engages with the male fitting body for holding the retainer in the compressed position until the male fitting body is seated within the corresponding female aperture.

20 Claims, 2 Drawing Sheets

HIGH PRESSURE QUICK CONNECT WITH REDUCED VOLUMETRIC DISPLACEMENT AND PILOTED SNAP RING

RELATED APPLICATION

This application is related to co-pending U.S. patent application Ser. No. 08/475,945 filed on Jun. 7, 1995 now U.S. Pat. No. 5,711,344 by inventor A, Beans for a "High Pressure Quick Connect for use in Automotive Brake System Application", now U.S. Pat. No. 5,711,549 issued Jan. 27, 1998.

FIELD OF THE INVENTION

This invention relates to a quick connect coupling for high pressure fluid, and more particularly, a male fitting portion of a quick connect coupling used in a fluid conduit system, such as an automotive brake system application.

BACKGROUND OF THE INVENTION

Quick connectors are used in a wide range of applications, and are frequently employed for joining fluid conduits in automotive and industrial applications. Typically, quick connectors are capable of being assembled in a single longitudinal movement to allow automated assembly and to increase production efficiency. To be accepted in the automotive industry, quick connect fittings need to provide an effective seal for handling volatile or hazardous fluids, such as gasoline, while permitting repair of the finished product by allowing repeated disassembly and reassembly of the quick connect fitting without adverse consequences to the effective seal of the fitting. When carrying hazardous material through the quick connect fitting, a primary concern is the prevention of unintentional release of the quick connect fitting. Industry standards require a relatively high axial pull off strength once the male fitting is fully seated within the female aperture to prevent the male and female portions of the quick connect fitting from pulling apart from one another. In contrast, low insertion force of the male portion into the female aperture of the quick connect fitting is desirable.

It is common in many high pressure fluid applications, such as brake lines, to use threaded fitting connections. Cross-threading of the fittings may occur if not aligned correctly, or over-threading may occur if excess torque is applied to the fittings. Sufficient damage may occur to the threads of the fittings to result in the parts being scrapped and replaced. The brake lines of an anti-lock brake control system are typically connected to a brake manifold or junction during the assembly process of the vehicle. This configuration may require threaded connections to be located in close proximity to one another, which can increase the difficulty and time required to correctly assembly the threaded fittings to a manifold.

In addition, a lack of consistency in the profile of the snap ring groove has been noted in production parts, possibly due to manufacturing tool wear during the production runs. If the profile of the snap ring groove is sufficiently out of design tolerance, the snap ring may be unable to fully seat within the snap ring groove. Furthermore, manufacturing tolerances for the quick connect fittings allow a chamber defined between the assembled male and female portions of the fitting to expand and retract during cyclical operation of a high pressure fluid application, such as an automotive brake system, which cycles between applying a high fluid pressure through the fluid conduit system and releasing the pressure, or producing slight vacuum, within the fluid conduit system.

SUMMARY OF THE INVENTION

It is desirable in the present invention to provide a quick connect fitting for high pressure fluid applications and more particularly for automotive brake systems. It is also desirable to provide a quick connect fitting for high pressure fluid applications that requires a high axial pull apart strength and low axial insertion force. It is desirable to provide a quick connect fitting that eliminates any threaded connection to reduce the amount of scrap generated as a result of cross-threading or over-threading. Furthermore, it is desirable to provide a quick connect fitting that reduces or eliminates changes or fluctuations in volumetric displacement due to cyclical fluctuations in fluid pressure within the fluid conduit system. It is also desirable to provide a quick connect fitting that includes a visual indication if the retainer is fully seated within a corresponding groove of the female aperture of the quick connect coupling. Furthermore, it is desirable to provide a quick connect coupling where the retainer or snap ring can be locked in the corresponding groove of the female aperture of the coupling in response to seating the male fitting within the corresponding female aperture.

According to the present invention, a quick connect coupling for high pressure fluid includes an elongated tube having a first end, and a male fitting body connected to the first end of the tube. The male fitting body has an annular recess formed therein. A retainer or snap ring is receivable within the annular recess of the male fitting body and is moveable between a compressed position allowing longitudinal insertion of the male fitting body within a corresponding female aperture and a released position for retaining the male fitting body seated within the female aperture. The present invention can also provide means for indicating if the retainer is fully seated within a corresponding groove of the female aperture. The present invention can provide biasing means for urging the male fitting in an opposite direction with respect to the longitudinal insertion direction within the corresponding female aperture. The present invention can provide locking means for maintaining the retainer in the released position in response to seating the male fitting body within the corresponding female aperture.

The high pressure quick connect coupling according to the present invention is easy to assemble, reduces assembly time, reduces worker fatigue and reduces system cost. No assembly tools are required for the high pressure quick connect coupling according to the present invention, thereby eliminating the need to provide tool clearance which is required with other fitting connections. In addition, this allows the ports to be moved closer to one another. The present invention eliminates threaded fittings and the problems associated with cross-threading or over-threading, and the necessity of gauging the torque applied to a threaded fitting. The quick connect coupling according to the present invention can be serviced with standard tools and the connection is reusable.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 2:
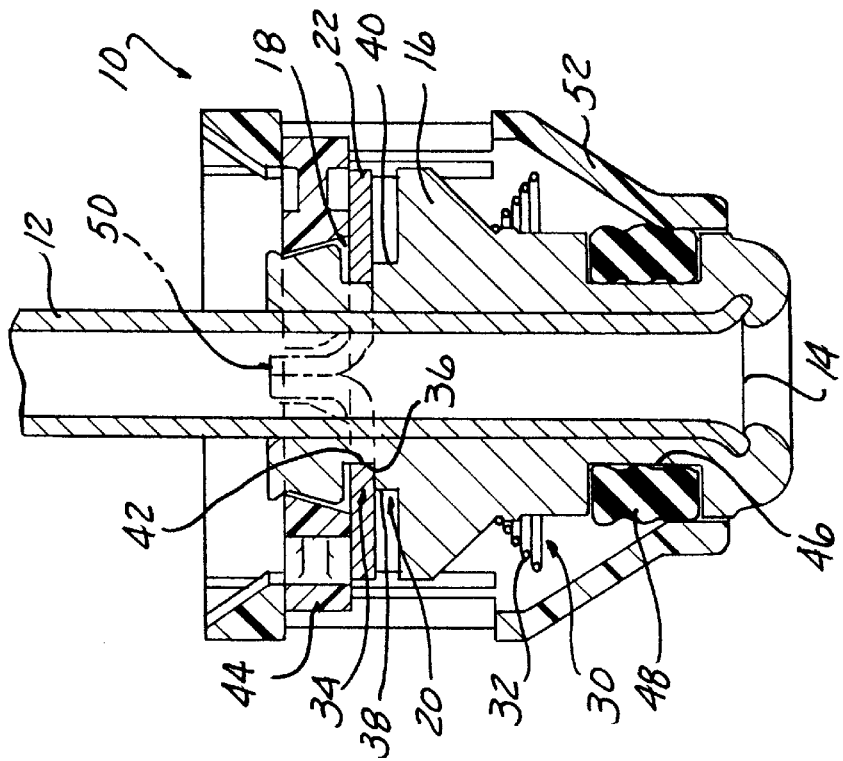
FIG. 2 is a cross-sectional view of the male portion of the quick connect coupling with a transport cover attached.

The present invention provides a quick connect coupling 10 which has a high pull out force, preferably exceeding 2225 Newtons (500 pounds-force), while having a low insertion force, preferably not exceeding 67 Newtons (15 pounds-force). The male fitting body portion 16 of the quick connect coupling 10 according to the present invention can include a retainer or snap ring 22 having longitudinally extending tabs 50 operable in conjunction with a pop top 44 releasably engageable with the male fitting body 16 for holding the retainer 22 in the compressed position until the male fitting body 16 is seated within the corresponding female aperture 24. A cover 52 can be provided to protect the male portion of the quick connect coupling 10 during transportation and storage prior to assembly.

In preparation for assembly of the male fitting portion with respect to the female fitting portion, the protective cover 52 is removed and the male fitting portion is longitudinally inserted within a corresponding female aperture 24 of a part, workpiece, or female fitting portion. During insertion into the corresponding female aperture 24, the pop top 44 makes contact with an outer surface of the female portion of the quick connect coupling 10, so that the pop top 44 is forced to move longitudinally away from the male fitting body portion 16 of the coupling 10 and along the tube 12 to separate the pop top 44 from the retainer 22 as the male fitting body portion 16 is further inserted within the corresponding female aperture 24. When the pop top 44 separates from the retainer 22, the tabs 50 are normally biased outwardly away from one another to enlarge the outer diameter of the retainer 22 and engage the outer periphery of the retainer 22 within the groove 26 of the female aperture 24 of the coupling 10. When in the expanded or released position, the outer periphery of the retainer or snap ring 22 is forced into the annular groove or channel 26 formed in the corresponding female aperture 24 of the quick connect coupling 10.

The retainer 22 includes an inner peripheral surface 42 which also expands when the retainer 22 moves from the compressed position to the released position. When the retainer 22 is in the released position, the male fitting body 16 has an enlarged shoulder 40 within the annular recess 18 defining a portion of the bottom wall 20 of the recess 18. The enlarged shoulder 40 has a face 38 defining a corresponding cross section to the inner peripheral surface 42 of the retainer 22. The enlarged shoulder 40 formed on the male fitting body 16 of the quick connect coupling 10 is engageable within the inner periphery 42 of the retainer 22, when the retainer 22 is in the released position and fully seated within the groove 26 of the female aperture 24 to lock the retainer 22 in the released or expanded position within the annular groove 26 of the female aperture 24. The movement of the male fitting body 16 to engage the enlarged shoulder portion 40 within the inner periphery 42 of the retainer ring 22 causes the male fitting body 16 to move axially with respect to the female fitting portion of the quick connect coupling 10 providing a visual indication that the retainer 22 has fully seated within the corresponding 26 groove of the female aperture 24. If the enlarged shoulder 40 is unable to be inserted within the inner periphery 42 of the retainer 22, a visual indication is given by the appearance of the male fitting body 16 being axially displaced from the fully inserted and locked position.

Figure 1:
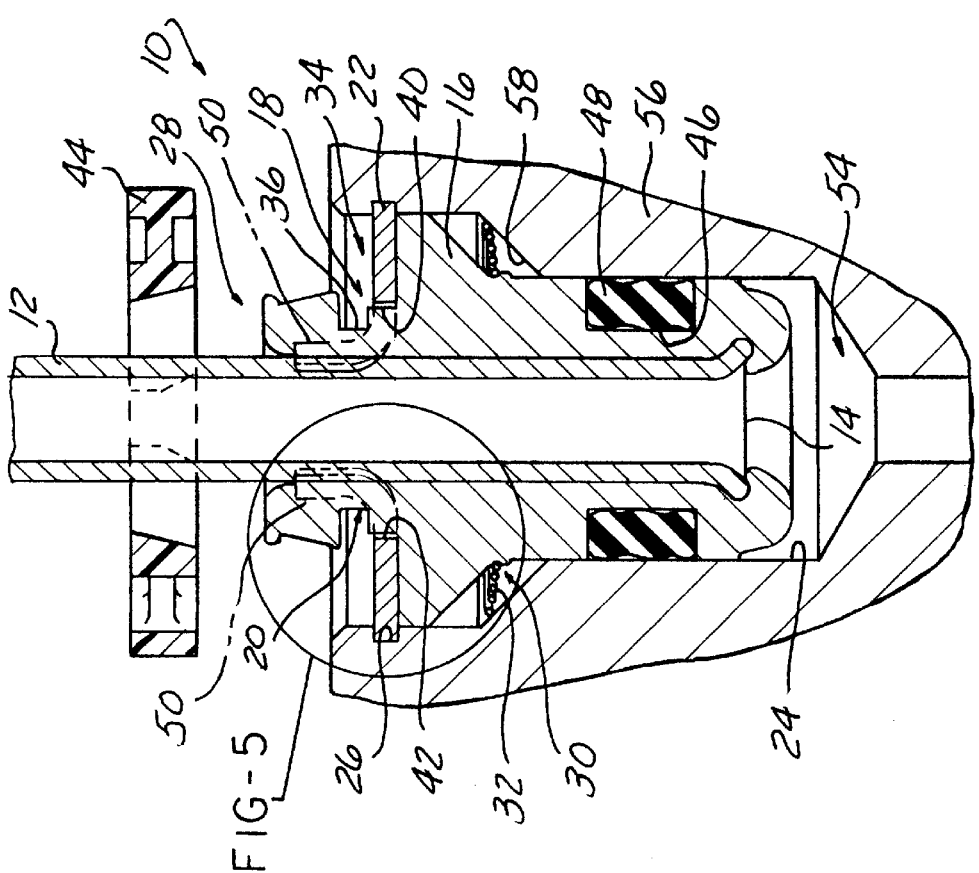
FIG. 1 is a cross-sectional view of a preferred embodiment of a male fitting portion of a high pressure quick connect coupling inserted into a corresponding female aperture.

Preferably, biasing means 30 is provided in the present invention for urging the male fitting body 16 in a direction to engage the enlarged shoulder 40 within the inner periphery 42 of the retainer 22 when inserted within the corresponding female aperture 24. Preferably, the biasing means 30 urges the male fitting body 16 in an opposite direction with respect to the longitudinal insertion direction to place the male fitting body 16 within the female aperture 24. The biasing means 30 eliminates the tolerance buildup of the various parts assembled into the quick connector coupling 10 to reduce or eliminate the changes in volumetric capacity of the chamber 54 (FIG. 1) defined between the male fitting body 16 and the corresponding female aperture 24 due to pressure fluctuations within the high pressure fluid conduit system. In a high pressure quick connect coupling 10 for a fluid handling system, it has been found that changes in volumetric displacement between the male fitting portion and the female fitting portion occurs as the pressure cyclicly oscillates between a low pressure state and a high pressure state. This volumetric change in displacement is due, at least in part, to movement of the male member 16 with respect the female member 24 as the pressure within the system changes. This movement is traceable, at least in part, to the tolerance build up of the assembled parts and can result in additional brake pedal movement for an automotive brake system application. The high pressure quick connect coupling 10 has reduced volumetric displacement fluctuation due to changes of fluid pressure within the fluid system and also includes a piloted snap ring 22. Volumetric displacement of the brake system is directly related to an increase in peddle travel, and customers have indicated that increased peddle travel is undesirable or not acceptable. Volumetric displacement is believed to be caused by four separate mechanisms in varying degrees of contribution to the overall volumetric displacement. The largest contributor is believed to be axial movement of the connection as increasing fluid pressure is applied relative to zero, or negative pressure conditions. In the present invention, axial movement is allowed only by the variation of the tolerance of the thickness of the snap ring 22 and the height of the annular groove 26 formed in the housing 56. The present invention seeks to greatly reduce or eliminate the axial movement made possible by the variation of the tolerances to significantly reduce the volumetric displacement associated therewith. A second mechanism believed to be responsible for displacement is movement of the seal 48 in the seal groove 46 as pressure is applied relative to zero, or negative pressure conditions. If the seal 48 were closely controlled dimensionally, and the seal groove 46 optimized for the worst case, the movement of the seal 48 could be minimized. A third mechanism believed to be associated with volumetric the displacement is the diameter of the seal 48. It is believed that any reduction in the outside diameter of the seal 48 relates to a reduction in volumetric displacement. A fourth factor believed to be associated with volumetric displacement is compression or movement of the seal 48 under the pressure of the brake system. The material and the geometry of the seal 48 should be selected to minimize compression under fluid pressure.

The quick connect coupling 10 according to the present invention also provides locking means 34 to maintain the snap ring 22 within the annular groove 26. The locking means 34 prevents disengagement of the snap ring 22 from the snap ring groove 26 due to a reduction in overall diameter of the snap ring 22 as a result of losing spring tension qualities from repeated pressure and temperature cycles over the life of the connector. The locking means 34 positively prevents disengagement of the snap ring 22 from the groove 26, thereby preventing any unintentional releasing of the connection.

The manufacturing process of making the groove 26 in the female bore 24 may also be subject to deterioration in profile to such a degree that the snap ring 22 may not seat properly within the groove 26 when assembled. It is suspected that tool wear conditions may be responsible for the deterioration and control of the tool wear conditions may not be possible to the degree desired. The present invention provides means 28 for indicating visually if the snap ring 22 has fully seated and locked within the corresponding annular groove 26 of the female aperture 24. In addition, the locking means 34 provided by enlarged shoulder 40 precludes any reduction in diameter due to a loss of spring tension qualities of the snap ring 22.

Figure 5:
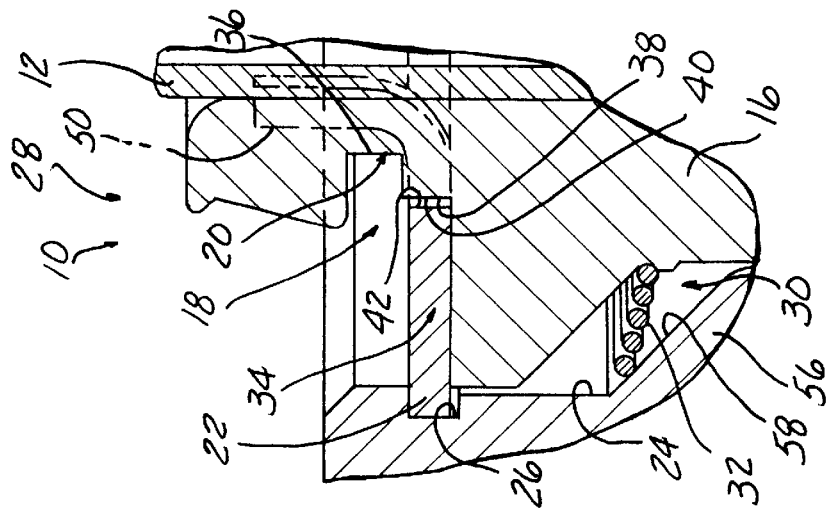
FIG. 5 is a partial cross-sectional detail view of the male fitting portion fully inserted and locked within the corresponding female aperture according to the present invention.
Figure 4:
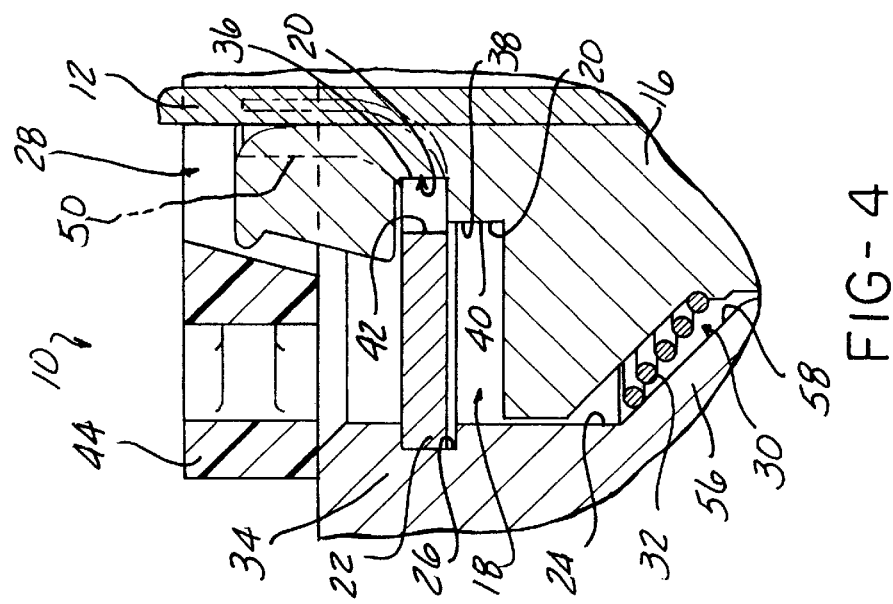
FIG. 4 is a partial cross-sectional detail view of the male fitting portion further inserted to an intermediate position within the corresponding female aperture.

In the shipped condition of the male portion of the quick connect fitting 10 according to the present invention shown in FIG. 2, the customer would receive the male fitting body 16 with the minor diameter 42 of the snap ring 22 piloted on the minor diameter of the annular recess 18 of the male fitting body 16 with a second major diameter 40 below the minor diameter of the annular recess 18. The delivery cover 52 can be removed for assembly, and the male fitting body 16 is aligned with the female aperture 24 in the housing 56. In this position, the biasing means 30 is in a relaxed position. During insertion into the housing 56, the seal 48 comes in contact with the seal bore of the female aperture 24 and the biasing means 30 such as thrust spring 32 makes contact with a thrust surface 58 defining a portion of the female aperture 24. The male fitting body 16 bottoms out with the thrust spring 32 fully compressed and the snap ring 22 aligned with the annular groove 26 as shown in FIG. 4. At the same time, the pop top 44 is sliding backwards on the tube 12. At the correct position, the pop top 44 releases the snap ring 22 to allow the snap ring 22 to engage within the annular groove 26. The male fitting body 16 rebounds, as a result of the urging of the spring force, to a final resting position, as illustrated in FIG. 5. The thrust spring 32 applies a constant outward force on the snap ring 22 and annular groove 26 arrangement. The snap ring inside diameter 42 is piloted on the major diameter or outer face 38 of the bottom wall 20 of the annular recess 18 formed in the male fitting body 16 so that the snap ring 22 can not reduce in diameter without the male fitting body 16 being pushed axially inwardly with respect to the female aperture 24 first. The male fitting body 16 is released by pushing the retainer body 16 inward to clear the retainer piloting bore or outer face 38, and then pinching the snap ring 22 with snap ring pliers to remove the male fitting body 16 from the female port 24. During normal operation, the snap ring 22 can not reduce in diameter to allow the connection to release.

The present invention substantially reduces or eliminates the allowable movement between the snap ring 22 and the groove 26, so that when brake pressure is applied, there is virtually no movement between the male fitting body 16 and the female aperture 24. The present invention also minimizes movement of the seal 48 in the seal groove 46, and the outside diameter of the seal 48. By piloting the snap ring 22 on the inner diameter 42 and the outer face 38 of the bottom wall 20 of the annular recess 18 formed in the male fitting body 16, the male fitting body 16 is maintained in a locked position with respect to the housing 56. The present invention substantially eliminates axial movement of the male fitting body 16 and the female aperture 24. The present invention substantially reduces the volume by approximately 90% that is subject to increase when brake line pressure is loaded into the fluid system. The biasing means 30, such as thrust spring or washer 32 urges the male fitting body 16 in a direction working against any vacuum that may occur within the fluid system to prevent axial movement of the male fitting body 16 with respect to the female aperture 24 in the housing 56. Therefore, the present invention preloads the assembled quick connect coupling 10 with a spring biasing force to reduce expansion and/or contraction of the chamber 54 by as much as 90%. The assembled configuration according to the present invention minimizes volumetric displacement in the fluid system traceable to the quick connect coupling 10.

Figure 3:
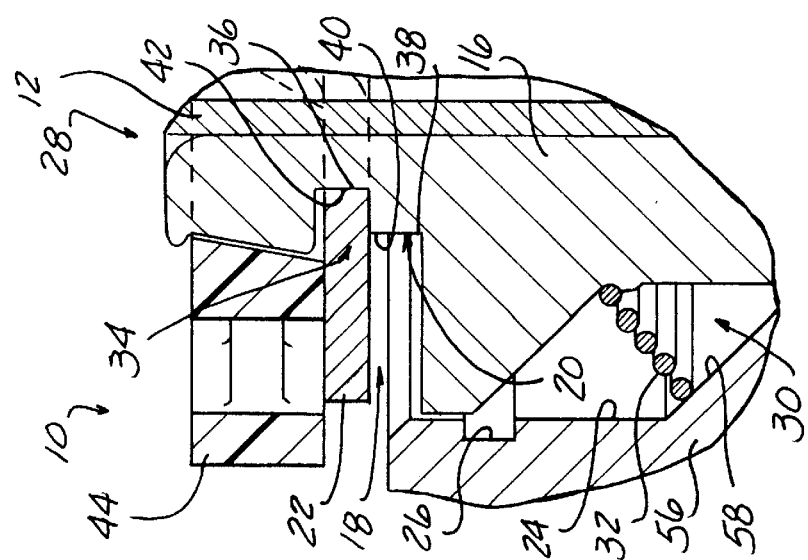
FIG. 3 is a partial cross-sectional detail view of the male fitting portion being initially inserted within the corresponding female aperture according to the present invention.

A quick connect coupling 10 for high pressure fluid according to the present invention includes an tube 12 having a first end 14. A male fitting body 16 is connected to the first end 14 of the tube 12. The male fitting body 16 has an annular recess 18 formed therein and defined at least in part by a wall 20 located adjacent the bottom of the annular recess 18. A snap ring or retainer 22 is receivable within the annular recess 18 of the male fitting body 16. The retainer 22 is movable within the annular recess 18 between a compressed position (illustrated in FIGS. 2 and 3) allowing longitudinal insertion of the male fitting body 16 within a corresponding female aperture 24, and a released position (shown in FIGS. 1 and 5) for retaining the male fitting body 16 seated within the female aperture 24. Preferably, the female aperture 24 includes an annular groove 26 formed therein for receiving the external periphery of the retainer 22 when in the released or expanded position.

Means 28 indicates if the retainer 22 is fully seated within the corresponding groove 26 of the female aperture 24. The indicating means 28 can include the male fitting body 16 moving from an axially inward position (shown in FIG. 4) to an axially outward position (shown in FIG. 5) to indicate a fully seated condition of the retainer or snap ring 22. The indicating means 28 can also include biasing means 30 for urging the male fitting body 16 in an opposite direction with respect to the longitudinal insertion direction within the corresponding female aperture 24. The biasing means 30 can include a thrust washer or compression spring 32 to urge the male fitting body 16 in an unseating direction with respect to the female aperture 24.

Locking means 34 maintains the retainer 22 in the released position in response to seating the male fitting body 16 within the corresponding female aperture 24. The locking means 34 can include the male fitting body 16 having an annular recess 18 extending radially inwardly from an external surface adjacent one end. The annular recess 18 can include a bottom wall 20 having a first radially inner peripheral face 36 and a second radially outer peripheral face 38 defining a stepped shoulder 40 at the bottom wall 20 of the recess 18. The retainer or snap ring 22 has an inner peripheral surface 42 adjacent the first inner face 36 of the male fitting body 16 when in the compressed position. The inner peripheral surface 42 of the retainer 22 is adjacent the outer face 38 of the male fitting body 16 when the retainer 22 is seated within the female aperture 24 in the released position. A pop top 44 is releasably engageable with the male fitting body 16 for holding the retainer 22 in the compressed position until the male fitting body 16 is seated within the corresponding female aperture 24. Preferably, the biasing means 30 acts in cooperation with the locking means 34 to normally bias the male fitting body 16 outwardly with respect to the female aperture 24 to seat the outer face 38 of the bottom wall 20 of the annular recess in the male fitting body 16 within the inner peripheral surface 42 of the retainer 22.

The present invention discloses a quick connect coupling 10 for high pressure fluid including a male fitting body 16 connected to an end 14 of an elongated tube 12. The male fitting body 16 has an annular recess 18 for receiving a retainer 22 movable between a compressed position allowing longitudinal insertion of the male fitting body 16 within a corresponding female aperture 24 and a released position for retaining the male fitting body 16 seated within the female aperture 24. Biasing means 30 is provided for urging the male fitting body 16 in the opposite direction with respect to the longitudinal insertion direction within the corresponding female aperture 24.

The present invention also discloses a quick connect coupling 10 for high pressure fluid including a male fitting body 16 connected on an end 14 of an elongated tube 12. The male fitting body 16 has an annular recess 18 for receiving a retainer 22 movable between a compressed position allowing longitudinal insertion of the male fitting body 16 within a corresponding female aperture 24 and a released position for retainer the male fitting body 16 seated within the female aperture 24. Locking means 34 is also provided for maintaining the retainer 22 in the released position in response to seating the male fitting body 16 within the corresponding female aperture 24.

Further details regarding the operation and configuration of the pop top 44 with respect to the assembly can be obtained from copending U.S. patent application Ser. No. 08/475,945 filed on Jun. 7, 1995 by the inventor Bruce A. Beans for a "High Pressure Quick Connect for use in Automotive Brake System Application" which is incorporated by reference herein in its entirety.

The present invention addresses the problems associated with axial travel of the snap ring 22 within the annular groove 26 formed in the wall defining the corresponding female aperture 24, and the problems associated with the change in volumetric displacement when the assembled parts are subjected to cyclical fluctuations in fluid pressure. The present invention limits axial movement of the male fitting body 16 with respect to the female aperture 24 by applying a constant load to the snap ring 22 and annular groove 26 assembly. Preferably, the constant load applied is approximately 10 newtons (2.25 pounds-force). In addition, the present invention minimizes the available space in the seal groove 46 formed in the external periphery of the male fitting body 16. The seal groove 46 is manufactured to minimize the available space in the seal groove area to minimize potential movement of the seal 48 within the seal groove 46. In order to further minimize the volumetric displacement, it is desirable to select a seal material and geometry that has minimal compressibility or movement under pressure while still providing the desired sealing characteristics. Alternatively, it may be desirable to reduce the cross-sectional area of the seal 48 and/or to reduce the outside diameter of the seal 48.

The present invention provides a quick connect coupling 10 having a male fitting body 16 that can be assembled with respect to a female aperture 24 with an insertion force of preferably less then 67 Newton (15 pounds-force). The present invention also preferably provides a quick connect coupling 10 that will not show a pressure rise greater than 2 millibar (mbar) when tested at a vacuum pressure of 2 millibar for 5 seconds, and will not show a pressure loss greater than 1 bar when testing at a pressure of up to 100 bar for 1 minute. The present invention provides a quick connect coupling 10 that reduces volumetric displacement to preferably no more than 0.030 cubic centimeters (0.0018 cubic inches). The quick connect coupling 10 according to the present invention can withstand tensile loads preferably of at least 2,225 Newton (500 pounds-force). The quick connect coupling 10 according to the present invention preferably provides a burst of pressure of approximately at least 350 bar (5,075 pounds per square inch gauge pressure).

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A quick connect coupling for high pressure fluid comprising:

an elongate tube having a first end;

a male fitting body connected to the first end of the tube, the male fitting body having an annular recess extending radially inwardly from an external surface adjacent one end, the annular recess having a first radially inner peripheral face and a second radially outer peripheral face defining a stepped shoulder at a bottom of said recess;

a retainer receivable within said annular recess of said male fitting body and moveable between a compressed position allowing longitudinal insertion of the male fitting body within a corresponding female aperture and a released position for retaining the male fitting body seated within the female aperture, the retainer having an inner peripheral surface adjacent the inner peripheral face of said male fitting body when in the compressed position and adjacent the outer peripheral face of the male fitting body when seated within the female aperture in the released position; and means for indicating if the retainer is fully seated within a corresponding groove of the female aperture, wherein the shoulder within the annular recess of the male fitting body prevents the male fitting body from moving to an axially outward position with respect to the female aperture unless the retainer is in the released position and fully seated within the corresponding groove of the female aperture.

2. The quick connect coupling of claim 1 wherein said indicating means further comprises:

said male fitting body moving from an axially inward position to the axially outward position to indicate a fully seated condition of the retainer.

3. The quick connect coupling of claim 1 wherein said indicating means further comprises:

biasing means for urging the male fitting body in an opposite direction with respect to said longitudinal insertion within said corresponding female aperture.

4. The quick connect coupling of claim 1 further comprising:

locking means for maintaining said retainer in said released position in response to seating the male fitting body within said corresponding female aperture.

5. The quick connect coupling of claim 4 wherein said locking means further comprises:

said outer peripheral face of the annular recess in the male fitting body preventing unintended compression of the retainer by obstructing radially inward movement of the inner peripheral surface of the retainer until the male fitting body is moved longitudinally inward within the female aperture while the retainer is in the released position thereby aligning the retainer with the inner peripheral face of the annular recess in the male fitting body allowing compression of the retainer to release the male fitting body from the female aperture.

6. The quick connect coupling of claim 1 further comprising:

a pop top releasibly engageable with the male fitting body for holding the retainer in the compressed position until the male fitting body is seated within the corresponding female aperture.

7. In a quick connect coupling for high pressure fluid including a male fitting body connected on an end of an elongate tube, the male fitting body having an annular recess for receiving a retainer moveable between a compressed position allowing longitudinal insertion of the male fitting body within a corresponding female aperture and a released position for retaining the male fitting body seated within the female aperture, the improvement comprising:

said male fitting body having an annular recess extending radially inwardly from an external surface adjacent one end, said annular recess having a first radially inner peripheral face and a second radially outer peripheral face defining a stepped shoulder at a bottom of said recess;

said retainer having an inner peripheral surface adjacent said inner face of said male fitting body when in the compressed position and adjacent the outer face of said male fitting body when seated within the female aperture in the released position, wherein the shoulder within the annular recess of the male fitting body prevents the male fitting body from moving to an axially outward position with respect to the female aperture unless the retainer is in the released position and fully seated within the corresponding groove of the female aperture; and biasing means for urging the male fitting body in an opposite direction with respect to said longitudinal insertion within said corresponding female aperture.

8. The improvement of claim 7 further comprising:

locking means for maintaining said retainer in said released position in response to seating the male fitting body within said corresponding female aperture.

9. The improvement of claim 8 wherein said locking means further comprises:

said outer peripheral face of the annular recess in the male fitting body preventing unintended compression of the retainer by obstructing radially inward movement of the inner peripheral surface of the retainer until the male fitting body is moved longitudinally inward within the female aperture while the retainer is in the released position thereby aligning the retainer with the inner peripheral face of the annular recess in the male fitting body allowing compression of the retainer to release the male fitting body from the female aperture.

10. The improvement of claim 7 further comprising:

means for indicating if the retainer is fully seated within a corresponding groove of the female aperture.

11. The improvement of claim 10 wherein said indicating means further comprises:

said male fitting body moving from an axially inward position to the axially outward position to indicate a fully seated condition of the retainer.

12. The improvement of claim 7 further comprising:

a pop top releasibly engageable with the male fitting body for holding the retainer in the compressed position until the male fitting body is seated within the corresponding female aperture.

13. In a quick connect coupling for high pressure fluid including a male fitting body connected on an end of an elongate tube, the male fitting body having an annular recess for receiving a retainer moveable between a compressed position allowing longitudinal insertion of the male fitting body within a corresponding female aperture and a released position for retaining the male fitting body seated within the female aperture, the improvement comprising:

locking means formed on the male fitting body for preventing radially inward compression of said retainer when said retainer is in said released position and engagable in response to seating the male fitting body within said corresponding female aperture.

14. The improvement of claim 13 wherein said locking means further comprises:

said male fitting body having an annular recess extending radially inwardly from an external surface adjacent one end, said annular recess having a first radially inner peripheral face and a second radially outer peripheral face defining a stepped shoulder at a bottom of said recess; and said retainer having an inner peripheral surface adjacent said inner face of said male fitting body when in the compressed position and adjacent the outer face of said male fitting body when seated within the female aperture in the released position.

15. The improvement of claim 14 wherein said locking means further comprises:

said outer peripheral face of the annular recess in the male fitting body preventing unintended compression of the retainer by obstructing radially inward movement of the inner peripheral surface of the retainer until the male fitting body is moved longitudinally inward within the female aperture while the retainer is in the released position thereby aligning the retainer with the inner peripheral face of the annular recess in the male fitting body allowing compression of the retainer to release the male fitting body from the female aperture.

16. The improvement of claim 13 further comprising:

biasing means for urging the male fitting body in an opposite direction with respect to said longitudinal insertion within said corresponding female aperture.

17. The improvement of claim 13 further comprising:

means for indicating if the retainer is fully seated within a corresponding groove of the female aperture.

18. The improvement of claim 17 wherein said indicating means further comprises:

said male fitting body moving from an axially inward position to the axially outward position to indicate a fully seated condition of the retainer.

19. The improvement of claim 13 further comprising:

a pop top releasibly engageable with the male fitting body for holding the retainer in the compressed position until the male fitting body is seated within the corresponding female aperture.

20. A quick connect coupling for high pressure fluid comprising:

an elongate tube having a first end;

a male fitting body connected to the first end of the tube, the male fitting body having an annular recess extending radially inwardly from an external surface adjacent one end, said annular recess having a first radially inner peripheral face and a second radially outer peripheral face defining a stepped shoulder at a bottom of said recess;

a retainer receivable within said annular recess of said male fitting body and moveable between a compressed position allowing longitudinal insertion of the male fitting body within a corresponding female aperture and a released position for retaining the male fitting body seated within the female aperture, said retainer having an inner peripheral surface adjacent said inner face of said male fitting body when in the compressed position and adjacent the outer face of said male fitting body when seated within the female aperture in the released position, wherein the shoulder within the annular recess of the male fitting body prevents the male fitting body from moving to an axially outward position with respect to the female aperture unless the retainer is in the released position and fully seated within the corresponding groove of the female aperture;

a pop top releasibly engagable with the male fitting body for holding the retainer in the compressed position until the male fitting body is seated within the corresponding female aperture;

biasing means for urging the male fitting body in an opposite direction with respect to said longitudinal insertion within said corresponding female aperture;

locking means for maintaining said retainer in said released position in response to seating the male fitting body within said corresponding female aperture, said outer peripheral face of the annular recess in the male fitting body preventing unintended compression of the retainer by obstructing radially inward movement of the inner peripheral surface of the retainer until the male fitting body is moved longitudinally inward within the female aperture while the retainer is in the released position thereby aligning the retainer with the inner peripheral face of the annular recess in the male fitting body allowing compression of the retainer to release the male fitting body from the female aperture; and means for indicating if the retainer is fully seated within a corresponding groove of the female aperture, said male fitting body moving from an axially inward position to the axially outward position to indicate a fully seated condition of the retainer.

* * * * *